United States Patent [19]

Graton et al.

[11] Patent Number: 5,722,895
[45] Date of Patent: Mar. 3, 1998

[54] TORSION PREDAMPER, NOTABLY FOR MOTOR VEHICLES

[75] Inventors: Michel Graton, Paris; Fabrice Tauvron, Creteil, both of France

[73] Assignee: Valeo, Paris, France

[21] Appl. No.: 553,259

[22] PCT Filed: Mar. 10, 1995

[86] PCT No.: PCT/FR95/00284

§ 371 Date: Nov. 13, 1995

§ 102(e) Date: Nov. 13, 1995

[87] PCT Pub. No.: WO95/24573

PCT Pub. Date: Sep. 14, 1995

[30] Foreign Application Priority Data

Mar. 11, 1994 [FR] France .................. 94 02960

[51] Int. Cl.$^6$ .................. F16D 3/66; F16D 3/14
[52] U.S. Cl. .................. 464/68; 192/213.12
[58] Field of Search .................. 464/66, 68; 74/574; 192/70.17, 213.12, 213.1, 213.11

[56] References Cited

U.S. PATENT DOCUMENTS

| 4,688,666 | 8/1987 | Blond . | |
|---|---|---|---|
| 4,860,871 | 8/1989 | Granton et al. | 464/68 X |
| 4,899,862 | 2/1990 | Granton et al. | 192/213.12 X |
| 5,000,304 | 3/1991 | Kock et al. | 464/68 X |
| 5,205,389 | 4/1993 | Raab et al. | 464/68 X |
| 5,238,096 | 8/1993 | Ament et al. | 464/68 X |
| 5,240,458 | 8/1993 | Linglain et al. | 464/68 X |
| 5,433,307 | 7/1995 | Jeppe | 464/68 X |
| 5,529,161 | 6/1996 | Ament et al. | 464/68 X |

FOREIGN PATENT DOCUMENTS

| 2411999 | 7/1979 | France . | |
|---|---|---|---|
| 2628807 | 9/1989 | France . | |
| 2151749 | 7/1985 | United Kingdom . | |
| 2247299 | 2/1992 | United Kingdom | 464/68 |
| 2254398 | 10/1992 | United Kingdom . | |

*Primary Examiner*—John M. Jillions
*Assistant Examiner*—Eileen A. Dunn
*Attorney, Agent, or Firm*—Longacre & White

[57] ABSTRACT

The torsion predamper has two metal guide washers (14A) disposed axially on each side of a web (13A) fixed to a hub (12). One of the guide washers (14A) has axially oriented mounting lugs (40) made in one piece with the outer periphery thereof. The said lugs extend beyond the outer periphery of the web (13A) and each passes with clearance through a complementary recess (41) formed on the outer periphery of the other guide washer (14A). The free end of the mounting lugs (40) is suitable for constituting a driving projection with the web (13B) of a second damping device (B), and is deformed radially inwards to form a retaining means (42, 142, 242) suitable for cooperating with the face of the washer (14A) in question turned the opposite way to the web (13A).

9 Claims, 2 Drawing Sheets

TORSION PREDAMPER, NOTABLY FOR MOTOR VEHICLES

BACKGROUND OF THE INVENTION

1. Field of the Invention

The present invention concerns, in general terms, torsion predampers, notably for motor vehicles, of the type having an input part and an output part coupled to each other by two torsion damping devices with action in stages, namely a first device, called a predamper, which, weaker than the other, constitutes a preassembled unit with the output part within the second device.

It relates more particularly to the predamper.

2. Description of the Prior Art

Such a damper is described in the document FR-A-2 570 147 (U.S. Pat. No. 4,688,666).

In this document, the torsion predamper is a clutch friction disc including (FIG. 1) a support 10 of friction linings 11 and a hub 12, which can move angularly with respect to each other within the limits of a predetermined angular movement.

The support 10 constitutes the input part of the damper, its friction linings 11 being suitable for being clamped between the thrust and reaction plates of a clutch (not shown), while the hub 12 constitutes the output part thereof, the said hub being suitable for being locked with respect to rotation on the input shaft of the gearbox.

The input part 10 and the output part 12 are coupled by two torsion damping devices, with action in stages, one of which A, referred to as the first damper, is weaker than the other one B, referred to as the second device, and forms a preassembled unit with the output part 12 within the second device B.

Each of these devices has a web 13A, 13B, two guide washers 14A, 14A'–14B, 14b' fixed to each other and elastic means 15A, 15B interposed circumferentially between the web and the guide washers.

In practice, the washers 14A, 14A'–14B, 14b' are disposed axially on each side of the web 13A–13B and the elastic means consist of elastic members with circumferential action mounted in housings formed respectively facing each other in the washers 14A, 14B and in the web 13A, 13B. For the sake of convenience the web 13A will be referred to as the first web, the other web 13B as the second web and the guide washer 14B, 14B' as the main guide washers.

The elastic members, here coil springs, of the first device A, firstly, are less stiff than the elastic members 15B, also coil springs, of the second device B and, secondly, are located radially below the said members 15B so that the first device A is weaker than the second device B.

The device A is mounted axially between one of the main washers 14B, 14b" and the second web 13B of the second device B.

It forms an assembly preassembled, here by means of crimping, with the hub 12.

The second web 13A of the first device A is rotatably fixed to the hub 12 by means of fluted mounting, while its guide washers 14A,14A' are coupled to the second device B by means of driving projections 23 engaged in notches 24 in the second web 13B.

This second web 13B is mounted with an angular clearance with respect to the hub 12. To this end, the web 13B has on its inner periphery a set of flutes 20', trapezoidal in shape, engaging with clearance with a set of flutes, of complementary trapezoidal shape, which the hub 12 has on its outer periphery.

The first device A thus acts between the hub 12 and the second web 13B of the second device B, whose main guide washer 14B,14b' are fixed, in this case by rivets 21, to the support 10.

The first device A is designed to act alone when the torque to be transmitted is very low or nil within the limits of the angular clearance provided between the first web 13B and the hub 12, while the device B acts for higher torques.

For this reason, this device A with elastic members of low stiffness is called a predamper, the stiffer springs 15B of the second device fixing overall the web 13B to the washers 14B,14B' during the relative movement between the web 13B and the hub 12. Once the clearance between the web 13B and the hub 12 has been taken up, the elastic members remain taut and a relative movement occurs between the web 13B and the washers 14B with the action of friction means with an elastic washer 33B and an application washer 36. For greater precision, reference should be made to the aforementioned document, notably with respect to the connection by means of crimping between the washers 14B.

In this document the aforementioned projections 23 are carried by the guide washer 14A of the first device A, adjacent to the web 13B of the second device B. These driving projections with the web 13B consist of pins with a circular contour of a single piece with the said washer 14A or attached thereto by riveting.

For the sake of convenience, this guide washer 14A will be referred to as the first washer, and the other guide washer 14A' the second washer.

The washers 14A,14A' are, moreover, made of metal and connected to each other by rivets 16A, which pass with clearance through recesses in the web 13A.

As a result, the predamper A has projections 23 and rivets 16A and the washers 14A must be stamped in line with the rivets 16A. In the document GB-A-2 247 299 there is described a predamper with axially oriented mounting lugs made in a single piece with the outer periphery of the second guide washer. The said mounting lugs extend at the outer periphery of the web and each passes with assembly clearance through a complementary recess formed on the outer periphery of the first washer. The free end of the mounting lugs is suitable for forming a driving projection with the web of the second damping device.

In practice, the lateral edges of the lugs are suitable for cooperating with associated lateral edges of the recesses for the connection of the first washer to the second washer with respect to rotation. The first washer is mounted so as to move axially with respect to the first washer so that, initially, the predamper does not form a sub-assembly.

The object of the present invention is to overcome the aforementioned drawbacks.

SUMMARY OF THE INVENTION

According to the invention, the predamper of the aforementioned type is characterised in that the free end of at least some of the mounting lugs is deformed radially inwards to form a retaining means suitable for cooperating with the face of the first washer turned the opposite way to the web, in that the said deformations leave intact the lateral edges of the recesses and in that the said mounting lugs extend radially beyond the outer periphery of the web. Preferably, the deformations are formed before assembly so that snapping-on means are formed with elastically deformable mounting lugs acting between the two guide washers.

By means of the invention, the number of components in the predamper is reduced and the guide washers are fixed to each other by the mounting lugs, and this in a simple and economical manner, without it being necessary to use a riveting operation, the deformations forming retaining shoulders cooperating with the inner edges of the recesses. Moreover, firstly, the web, whose manufacture is simpler, is not recessed and is therefore more robust and, secondly, the mounting lugs do not limit the relative angular movement between the web and the guide washers of the predamper. These lugs are relatively long and therefore flexible, while having no enlarged portion, in contrast with the lugs of the document GB-A-2 247 299, so that they are more flexible.

Furthermore, the manufacture of the unitary predamper/hub assembly is simplified and requires lighter and therefore less expensive tooling.

By means of the invention it is possible to manufacture a hub/web sub-assembly in a first production unit, for example by crimping the web onto the hub, and then mounting the rest of the predamper in another production unit, in order to obtain a captive unit which can be handled and transported.

By virtue of the metallic nature of the guide washers, on the one hand, the mounting lugs are obtained easily by means of cutting and bending on a press and, on the other hand, their deformation makes it possible to work-harden the metal at the driving projections, which stiffens and hardens the latter.

As the lugs are flat and thin, the projections are not any more bulky radially than the aforementioned pins.

These deformations can consist of hollows, indentations or folds which can pass elastically into the recesses.

It will be noted that the guide washers are of simple construction, the first washer being flat, without embossing for its connection to the other guide washer, in contrast with that of the prior art.

The first washer is, moreover, rotatably connected to the second washer by means of the cooperation of shapes between the recesses and the lugs.

It will be appreciated that the springs 15A of the predamper A naturally form braces between the guide washers. The predamper can therefore function advantageously without a friction washer and the lugs are then simplified by the absence of a shoulder, in contrast with that of the document GB-A-2 247 299.

It will be appreciated that the lugs continues to fulfil their function of locking the first washer with respect to rotation.

They preferably affect the lugs centrally so that the driving projection function is not disrupted.

The description that follows illustrates the invention in relation to the accompanying drawings, in which:

DETAILED DESCRIPTION OF THE PREFERRED EMBODIMENT

Figure 2:
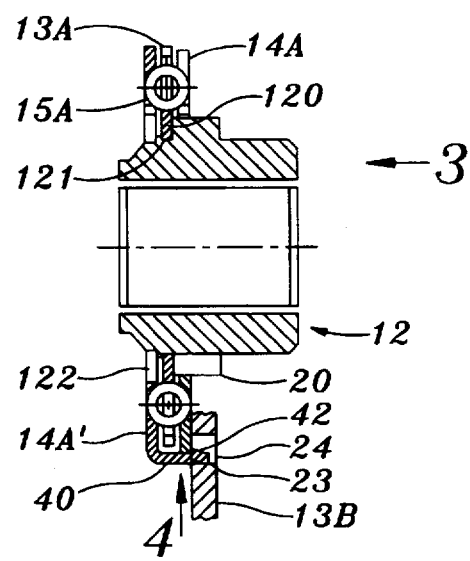
FIG. 2 is a view in axial section along the line 2—2 in FIG. 3 of the preassembled unit consisting of the output part and predamper according to the invention.

In FIG. 2, a preassembled unit consisting of the hub 12 and predamper A is seen, the same references being employed for the elements common to the invention and to those of the prior art.

Figure 1:
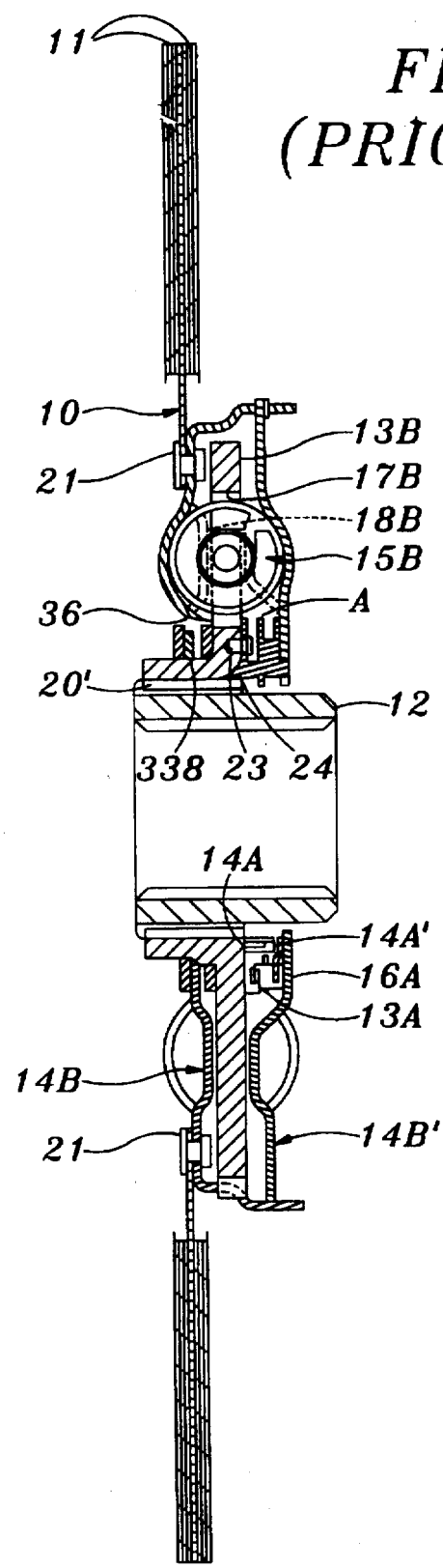
FIG. 1 is a view in axial section of a friction web of the prior art.

The unit is thus suitable, because of its metal guide washers 14A', for being mounted between the main guide washer 14B,14b" and the second web 13B in FIG. 1, the driving projections 23 being suitable for cooperating in a complementary manner with the recesses 24 in the second web 13B of the second device B.

These projections 23 therefore enter the recesses 24 and engage with the latter for the connection in rotation of the washers 14A,14A' with the second web 13B.

The first web 13A of the predamper is fixed, at least circumferentially, that is to say with respect to rotation, to the hub 12. This hub 12 has at its outer periphery, projecting over a part of its length, aforementioned flutes 20, and in its internal bore flutes for its connection in rotation with the input shaft of the gearbox, not shown.

Beyond a transverse shoulder 120 the flutes 20 are of reduced height and on its internal periphery the web 13A, here made of metal like the hub 12, has flutes 121 through which it engages without clearance with the portion of reduced radial height of the flutes 20.

Here, the web is also fixed axially to the hub 12. This web 13A bears against the shoulder 120, by one of its faces, and, on its other face, an enlargement 122, made by crimping from the portion of reduced radial height of the flutes 20, holds it in axial abutment against the transverse shoulder 120.

There is thus formed, by crimping, a unitary sub-assembly consisting of the hub 12 and predamper A that can be handled and transported.

The metal guide washers 14A,14A' produced by means of stamping on a press, extend axially on each side of the web 13A and have, facing the windows 17A of the web, windows 18A for fitting elastic members 15A, coil springs in this case, and as a variant blocks of elastic material such as elastomer or rubber, acting circumferentially between the web 13A and the said washers 14A,14A' in order to connect them elastically circumferentially, the washers 14A,14A' surrounding the hub 12 with clearance.

In this case, the springs 15A are mounted without clearance in the said windows 17A, 18A, but some can, of course, be mounted without clearance in the windows 18A and with clearance in the windows 17A for better filtration of vibrations. In this case, six springs 15A are distributed regularly circumferentially.

The guide washer 14A', referred to as the second washer, furthest from the main part, of greater height, of the flutes 20 and of the web 13B has, of a single piece at its outer periphery, axially oriented mounting lugs 40. These lugs 40, four in number in this case, distributed regularly circumferentially, each pass with assembly clearance through a complementary recess 41 formed at the outer periphery of the other guide washer 14A, referred to as the first washer. A rotational connection between the washers 14A is thus produced.

This first washer 14A surrounds the principal part of the flutes 20 and is suitable for being mounted adjacent to the web 13B of the device B.

The recesses 41 are open towards the outside and have a shape complementary to the flat thin lugs 40. These lugs 40 therefore have a rectangular shape in cross section.

According to another characteristic of the invention, the free end of the lugs 40 is suitable for forming driving projections 23 and is deformed radially inwards to form a retaining means 42, 142, 242 suitable for cooperating with the face of the first washer 14A turned the opposite way to the web 13A.

These retaining means therefore form retaining shoulders, the deformations advantageously having a low radial height.

Figure 8:
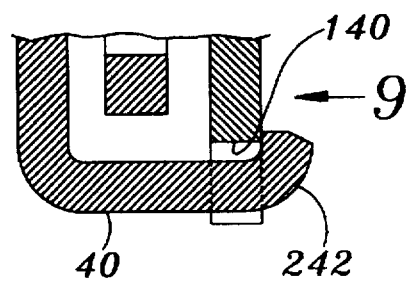
FIGS. 6,7 and 8,9 are views similar to FIGS. 4 and 5 for, respectively, a second and third example embodiment.
Figure 9:
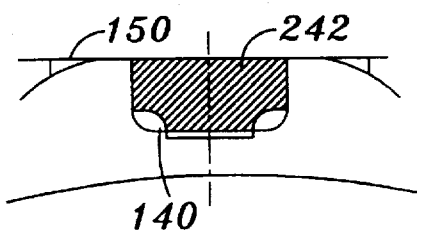
Figure 3:
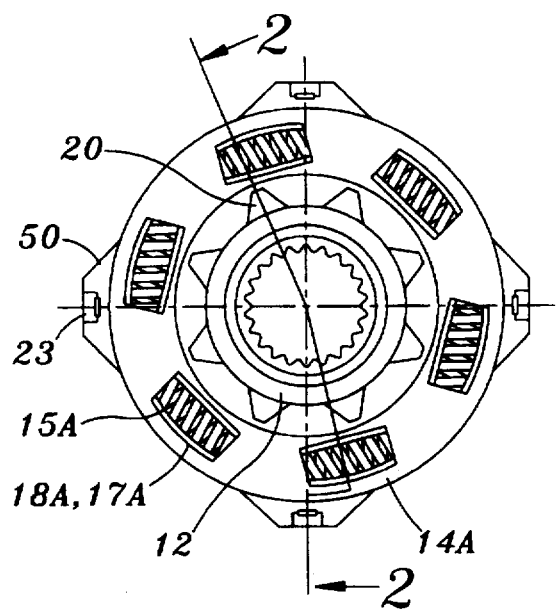
FIG. 3 is a view in the direction of the arrow 3 in FIG. 2.
Figure 4:
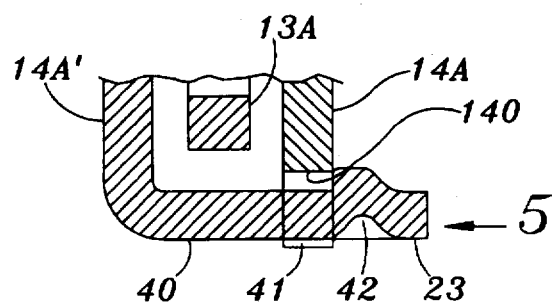
FIG. 4 is an enlarged view in the direction of the arrow 4 in FIG. 2.
Figure 6:
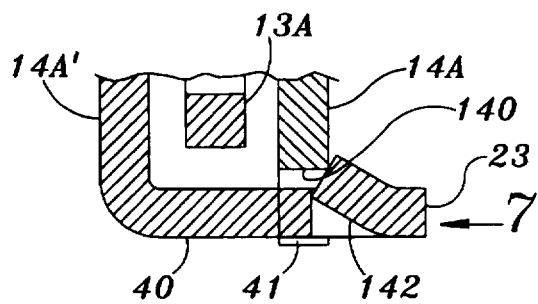
Figure 5:
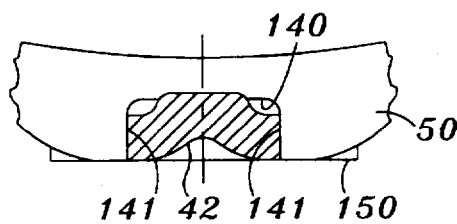
FIG. 5 is a partial view in the direction of the arrow 5 in FIG. 4.
Figure 7:
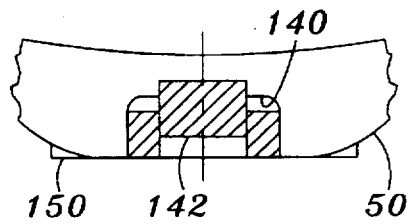

In FIGS. 4 and 5 these deformations consist of hollows 42, in FIGS. 6 and 7 they are indentations 142 and in FIGS. 8 and 9 folds 242, radial overall and turned towards the axis of the assembly.

In each case, the deformations have a low radial height and are suitable for cooperating with the tangentially oriented inner edge 140 of the recess 41 provided with rounded parts for the connection of the said edge 140 to the lateral edges 141, extending transversely, of the open recess 41 and avoiding the formation of incipient ruptures. The inter edge 140 is so called because it is closest to the axis of the assembly.

These recesses 41 are formed by means of radial projections 50, here trapezoidal overall, which the first washer 14A has on its outer periphery.

Of course, as a variant, it is possible to increase the external diameter of the washer in order to form recesses 41.

Similarly, the mounting lugs 40 are formed by means of radial projections 150, trapezoidal in shape overall, or rectangular in this case, which the second washer 14A has on its outer periphery facing the projections 50. The projections 50, 150 are suitable for being interposed circumferentially between two consecutive springs 15B of the second device.

Of course, it is possible to increase the external diameter of the second washer in order to form the lugs, and all combinations are possible, for example first washer continuous with increased diameter and second washer with projection 150, and vice versa.

It will be noted, in accordance with one characteristic of the invention, that the deformations 42, 142, 242 do not affect their lateral edges. These edges are thus intact, to cooperate with the lateral edges 141 of the recess 41 and with the recess 24 of the web 13B of FIG. 1. Preferably, the deformations affect the mounting lugs centrally, that is to say symmetrically.

These lugs 40 extend at a distance from the inner edge 140 of the recess 41, parallel thereto.

A radial clearance therefore exists between the lugs 40 and the edge 140. It will be noted that the lugs 40 lie within the overall contour of the projections 50 and are not therefore radially protuberant with respect to the latter.

It will be noted that the free end of the folds 242 is bevelled (FIG. 8).

In FIGS. 4 and 5 and 6 and 7 bevels are formed naturally. Advantageously, in FIGS. 4 and 5, the boss 42 is hemispherical in shape. It therefore has a very simple shape, while not being very harsh. It is easy to produce.

The driving part of the lugs 40 (its lateral ends), required for the connection by cooperation of shapes with the lateral edges 141 of the recesses 41, is thus preserved, and it is possible to produce easily, by virtue notably of the length of the lugs 40 and the radial clearance between the lugs 40 and the edges 140, an assembly by means of snapping-in between the washers 41; the coil springs 15A here defining the axial separation between the washers 14A,14A', devoid of contact with the web 13A.

These springs therefore naturally form braces, so that the predamper can function advantageously without a friction washer.

By virtue of the aforementioned radial clearance between the lugs 40 and the edges 140, the force required for snapping in the lugs 40 which are permitted to be inserted into the recesses 41 and to be deployed elastically towards the outside during this operation, in order for them to return to their initial position after they have passed into the recess, is reduced.

Of course, a slight over-travel is effected. It will be noted that the projections 150 assist such an over-travel and offer at the same time a bearing surface to a tool for the purpose of snapping in.

After this operation, the deformations 42, 142, 242 come into engagement with the edge 140.

It will be appreciated that the indentations 142 assist the deployment of the lugs by virtue of the great length of their slope and because the hollows 42 enable the snapping-in force to be reduced to a minimum.

Of course, the present invention is not limited to the example embodiment described. In particular, the deformations could be produced after the lugs 41 have been inserted into the recesses.

It is possible to interpose friction washers between the web and the guide washers.

The projections 23 can cooperate, depending on the application and the space available, with recesses formed in the bottom part of the windows 17B in the web 13B. The web 13B is not necessarily L-shaped: it can be flat. A friction washer can be bonded to the outer face of the second washer 14A in order to avoid metal-to-metal contact between this washer 14A and the guide washer 14B of the device B, notably when the web 13B is flat, the friction device with an application washer and elastic washer then axially clamping the predamper A between the web 13B and the washer 14B of the second device B.

In each case, the lugs 40 do not interfere with the web 13A and the springs 15A, since they extend radially above the web 13A.

The springs 15A can therefore be disposed as required, and their size and/or number increased.

The recesses 40 can consist of windows, a sufficient radial clearance then existing between the lugs and the top edge of the recess.

The support 10 can be fixed directly to a reaction plate. As a variant, it can consist of a piston of a locking clutch mounted in the casing of a torque converter, the predamper then being lubricated.

In all cases, a captive, unitary block consisting of the hub 12 and predamper A is formed, which can be handled and transported.

Of course, depending on the application, it is possible for only one part of the lugs to be provided with deformations, the others remaining unchanged.

It will be appreciated that the embodiment in FIGS. 4 and 5 is particularly advantageous, since it leads to the formation of a boss and affects the flange very little. This highly localised hollow 42 can be hemispherical. In all cases it is easy to produce and not very harsh.

It will be appreciated that the lugs 40 have, in this case, a constant width due to the fact that they extend radially beyond the web so that they do not limit the movement of the web 13A with respect to the washers 14A,14A'. These lugs 40 are thus more flexible.

We claim:

1. A torsion damper comprising: a hub (12), first and second webs (13A,13B) fixed to the hub (12), first and second metal guide washers (14A, 14A') disposed axially on each side of the first web (13A), in which the second guide washer (14A') has axially oriented mounting lugs (40) made as a single piece with the outer periphery of the second washer, and each mounting lug having a free end passing with assembly clearance through a complimentary recess (41) formed on the outer periphery of the first guide washer (14A) to cooperate with associated lateral edges (141) of recesses (41) for the connection in rotation of the first washer (14A) to the second washer (14A') and in which the free end of the mounting lugs (40) form a driving projection in contact with the second web (13B), wherein the free end of at least some of the mounting lugs (40) have radially inward deformations to form a retaining means (42, 142, 242) for cooperation with the face of the first washer (14A), the deformations (42, 142, 242) leave intact the lateral edges (141) of the recesses (140), said mounting lugs (40) extend radially beyond the outer periphery of the web (13A), and the deformations are located in the central portion of the mounting lugs, leaving the lateral edges of the mounting lugs intact for cooperation with the lateral edges of the recess.

2. The torsion damper according to claim 1, wherein the deformations (42,142,242) are formed before the mounting lugs are inserted into the recesses (41) so that the mounting lugs (40) form elastically deformable which act between the two guide washers (14a,14a').

3. The torsion damper according to claim 1, wherein a radial clearance exists between the inner edges (140) closest to the axis between the recesses (41) and the mounting lugs (40).

4. The torsion damper according to claim 1, wherein the mounting lugs (41) are formed by means of radial projections (150) formed on an outer periphery of the second washer, while the recesses (40) are formed by means of radial projections (50) on an outer periphery of the first washer (14A) facing the projections (50) of the second washer (14).

5. The torsion damper according to claim 1, wherein the recesses (41) are open towards the outside.

6. The torsion damper according to claim 1, wherein, the deformations consist of folds (242) radial overall and turned radially inward.

7. The torsion damper according to claim 6, wherein the free end of the folds (242) is bevelled.

8. The torsion damper according to claim 1, wherein the deformations consist of indentations (142).

9. A torsion damper comprising: a hub (12), first and second webs (13A,13B) fixed to the nub(12), said torsion damper having first and second metal guide washers (14A, 14A') disposed axially on each side of the first web (13A), in which the second guide washer (14A') has axially oriented mounting lugs (40) made in a single piece with the outer periphery thereof, and each second guide washer having a free end passing with assembly clearance through a complimentary recess (41) formed on the outer periphery of the first guide washer (14A) to cooperate with associated lateral edges (141) of recesses (41) for the connection in rotation of the first washer (14A) to the second washer (14A') with respect to rotation, and in which the free end of the mounting lugs (40) form a driving projection in contact with the second web (13B), wherein the free end of at least some of the mounting lugs (40) have radially inward deformations to form a retaining means (42, 142, 242) for cooperation with the face of the first washer (14A), the deformations (42, 142, 242) leave intact the lateral edges (141) of the recesses (140), said mounting lugs (40) extend radially beyond the outer periphery of the web (13A), and the deformations are in the form of bosses.

* * * * *